(12) United States Patent
Ibañez Sapiña

(10) Patent No.: US 6,173,743 B1
(45) Date of Patent: Jan. 16, 2001

(54) DISTRIBUTOR FOR LIQUIDS

(75) Inventor: Miguel Ibañez Sapiña, Barcelona (ES)

(73) Assignee: Valvules I Racords Canovelles, S.A. (ES)

( * ) Notice: Under 35 U.S.C. 154(b), the term of this patent shall be extended for 0 days.

(21) Appl. No.: 09/483,975

(22) Filed: Jan. 18, 2000

(51) Int. Cl.[7] .................................................. F16K 11/06
(52) U.S. Cl. ...................... 137/625.46; 251/160
(58) Field of Search ................ 137/625.46; 251/160, 251/185

(56) References Cited

U.S. PATENT DOCUMENTS

| | | | |
|---|---|---|---|
| 2,253,020 | * | 8/1941 | Daniels .................................. 251/160 |
| 2,451,678 | * | 10/1948 | Johnson et al. ....................... 251/160 |
| 3,640,310 | * | 2/1972 | Erlich ................................ 137/625.46 |
| 3,911,956 | * | 10/1975 | LeBreton et al. ................. 137/625.46 |

* cited by examiner

Primary Examiner—John Fox
(74) Attorney, Agent, or Firm—Steinberg & Raskin, P.C.

(57) ABSTRACT

A distributor for liquids including a two-diameter (1a, 1b) base body (1) provided with the inlet (4) for the liquid in the upper portion (1a) having the bigger diameter and with several outlets (5) in the lower, compartmented portion (1b), a rotatable obturator bell (3) inferiorly resting on said lower portion through the intermediary of a doubly annular seal (20, 21) provided with radial lengths (21') and partially inlaid in respective grooves (22, 23, 23') provided in the lower edges of said bell with which this latter comes to rest on said lower portion. Onto said body (1) is fitted in a bayonet coupling arrangement a cover (2) having around its central area an upper, annular salient (11) provided with radial slots (11'), the end (9') of a handle (9) being arranged in said central area of the cover and being eccentrically linked to a centrally located vertical shaft (7) upperly formed by the bell (3), said shaft projecting through an orifice (8) of said cover (2) after having received a helical spring (14) surrounding it and pushing the bell (3) in a downward direction, said handle (9) comprising a lower stop (13) and a radial appendage (12) provided on the end (9').

6 Claims, 3 Drawing Sheets

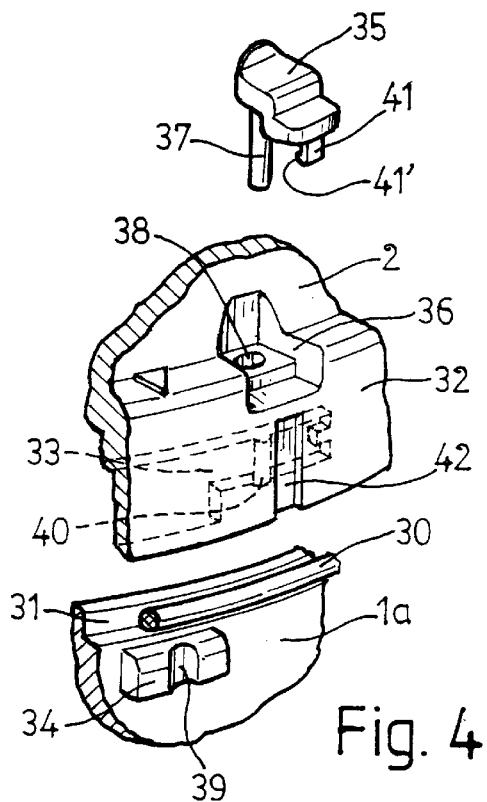
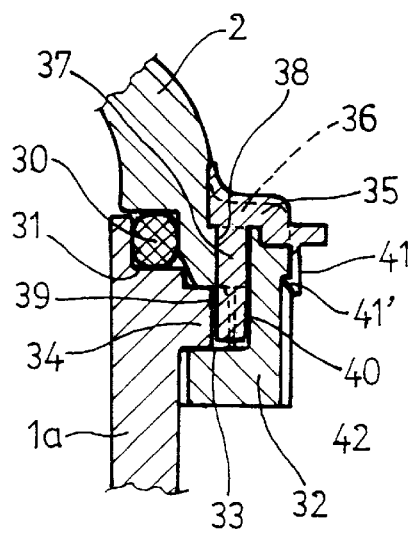
Fig. 4
Fig. 5
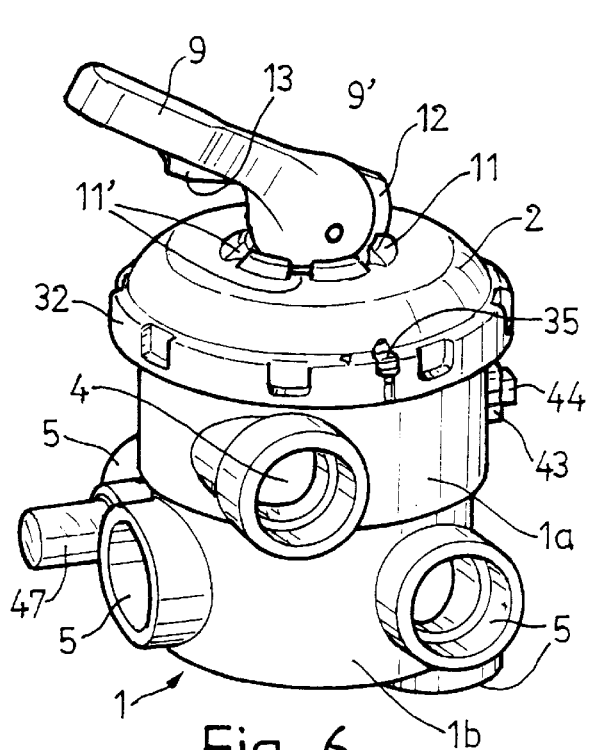
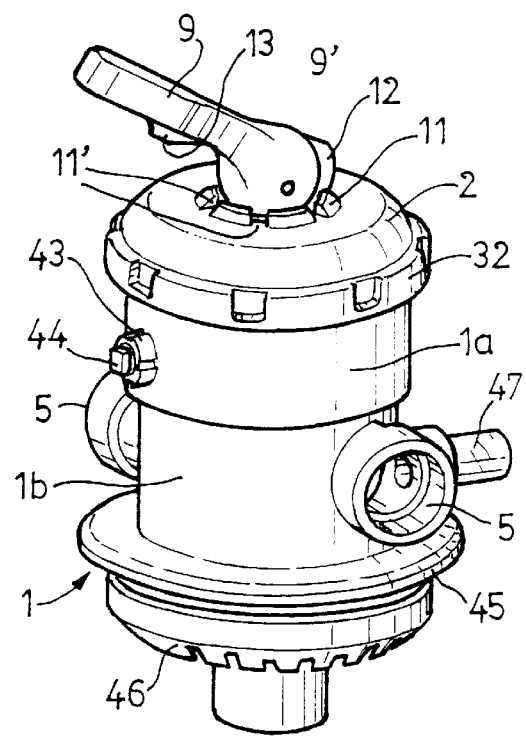
Fig. 6
Fig. 7

DISTRIBUTOR FOR LIQUIDS

FIELD OF THE INVENTION

The present invention relates to a distributor for liquids.

The distributor proposed by the invention is of the type comprising a base body radially compartmented as per the intended application and provided with pertinent outlets, a cover being secured on top of the body, a rotatable obturator bell being innerly interposed between the portion provided with the liquid inlet and the compartmented portion provided with the liquid outlets, said obturator bell being provided with a communication opening and governed by an external control handle that will slightly lift it off said compartmented portion, a spring keeping said bell in abutting contact against the top of said compartmented portion, said bell being thus apt to be rotated to the intended position.

BACKGROUND OF THE INVENTION

One of the problems presented by the known distributors of this type lies in the fact that the base body and the cover, this latter in many cases forming a receptacle of dimensions similar to those of the base body and comprising the liquid inlet, are joined together through their respective open top and open bottom in a complex way by mutually fastening their corresponding outer flanges by means of bolts and nuts which with the passage of time do usually deteriorate and loosen thus giving rise to the consequent drawbacks such as leaks.

Another problem lies in the fact that the bell is generally provided in such a way that it rests on the open top of the compartmented portion through a seal fitted into said open top, into the edge of the compartmenting partitions and into that of the central core of said compartmented portion, this giving rise to the fact that when the liquid flows into the distributor the sand (in case of fitting the distributor to filters) or other residues possibly carried by said liquid do accumulate particularly on the external portion of said seal thus facilitating the erosion and wear of this latter.

This erosion takes place when actuating the bell and mainly when closing it onto the compartmented portion of the distributor, since the helical spring pushing said bell against said compartmented portion tends to rotate the former during said closure, this giving rise to a friction caused by the sand against the seal and hence to said progressive deterioration of this latter which then has to be replaced with another one with the consequent inconvenience caused by this.

Another drawback of the known distributors lies in the fact that the obturator bell is associated with the external control handle through a shaft attached to said bell, said shaft sometimes getting loose with the use and thus also giving rise to consequent serious problems even related with the vertical guiding and shifting of the bell.

Also when the external control handle is actuated in order to lift the bell this latter is usually given an excessive shift that can damage it or other elements of the distributor, as well as the spring pushing said bell against the compartmented portion, due to an excessive compression of said spring.

OBJECTS AND SUMMARY OF THE INVENTION

All these problems and drawbacks and others possibly deriving from them are solved with the distributor for liquids according to the present invention, said distributor having its base body formed by two portions of different diameter, the upper portion having the bigger diameter laterally comprising the liquid inlet, whereas the lower portion comprises the several outlets and the compartmenting partitions starting from a central core, the bell being located inside the base body and resting on the edges of said partitions and core and also on the peripheral step determined by the two portions of said base body, the cover closing said body by being fitted onto it as per a bayonet coupling arrangement not needing bolts and nuts.

In the present distributor the obturator bell is the element comprising the seal (this latter being a doubly annular seal provided with radial lengths), said seal being partially inlaid in corresponding grooves provided in the lower sealing edges of said bell thus not allowing the sand or other residues to accumulate on it since when the bell is lifted said seal is also lifted with it, and thus said residues slide towards the inside of the base body before the bell is closed.

The shaft associating the bell with the external control handle is an advantageously integral part of said bell and cannot therefore be detached from this latter, the manufacture thus becoming easier and therefore more economical, said shaft also comprising an axial hollow opening through the bottom of the bell and allowing to perfectly guide said bell on an upper appendage of the central core of the lower portion of the base body.

The external control handle is in its turn formed by a handle having a lower stop delimiting its downward shift when it is actuated in order to lift the bell hence delimiting the shift of this latter when being lifted and thus preventing an excessive compression of the spring pushing said bell.

In order to facilitate the action of the handle on the top flat surface of the cover where said handle rests though its end the central area of said surface comprises a discoidal recess housing a friction washer being upperly flush with said surface.

The top surface of the cover is also provided around the central area with an annular salient with radial slots into one or another of which a radial appendage will be introduced which is provided on the end of the handle resting on said cover, in order to thus stabilize the position chosen for the bell, this allowing to do without the provision of a depression with radial recesses hitherto provided in the distributors for liquids and whose configuration made it difficult to remove the sand and other residues accumulating in it and hence hindering the perfect stabilization of the bell.

BRIEF DESCRIPTION OF THE DRAWINGS

These and other characteristics will be apparent from the following detailed description the understanding of which will be easier by referring to the accompanying three sheets of drawings which show a practical embodiment cited only by way of an example and not limiting the scope of the present invention.

In the drawings:

FIG. 4 illustrates in a perspective view a detail view of an edge of the open top of the base body above which is shown the corresponding edge of the cover which engages it as per a bayonet coupling arrangement, and also a piece assuring said engagement;

FIG. 5 is a sectional elevation of the ensemble of elements of FIG. 4 already fitted together, and each of FIGS. 6 and 7 shows a perspective view of the distributor and an alternative arrangement of the latter, respectively.

DETAILED DESCRIPTION OF THE INVENTION

Figure 1:
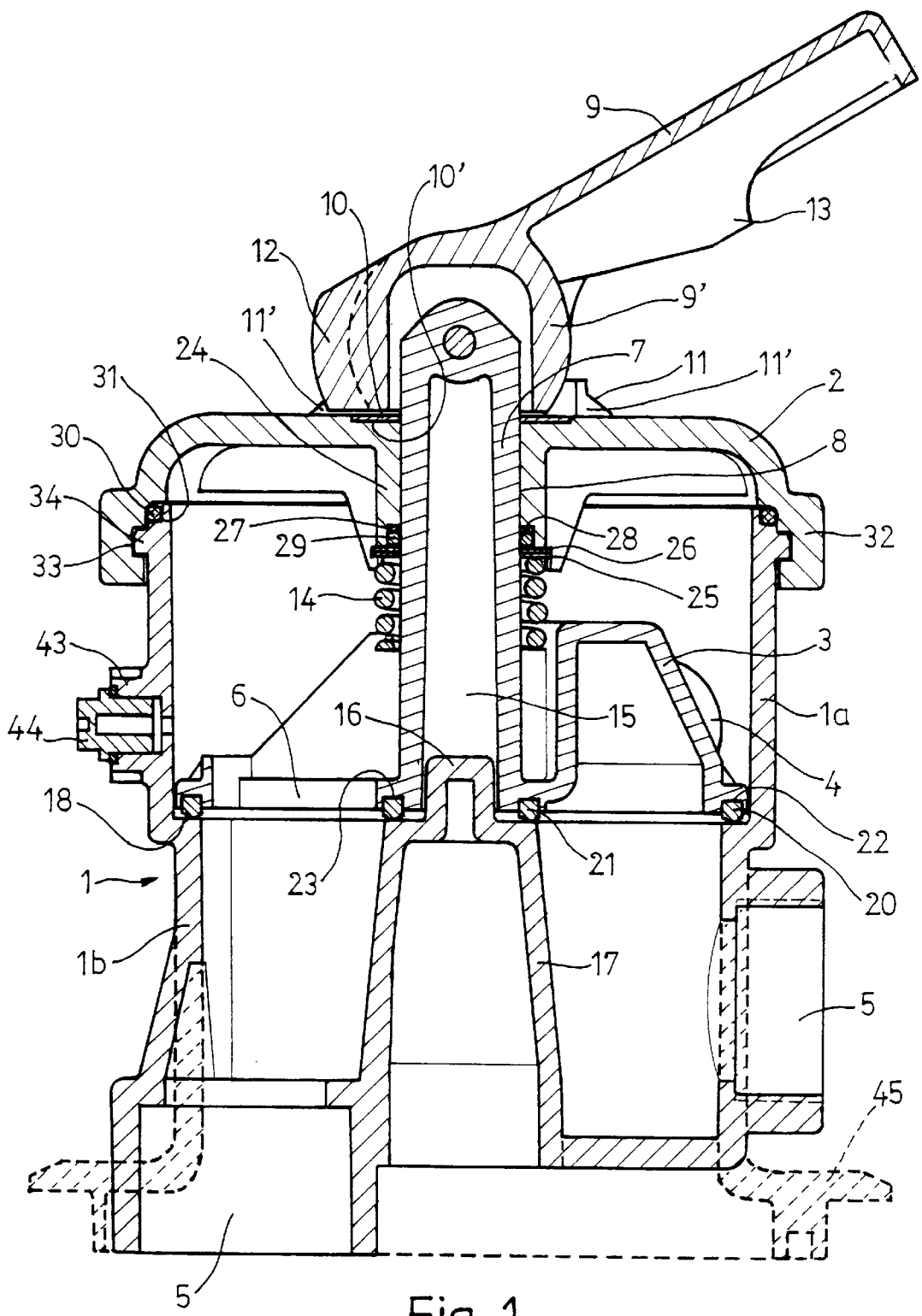
FIG. 1 is a sectional elevation view of the distributor according to the present invention.
Figure 2:
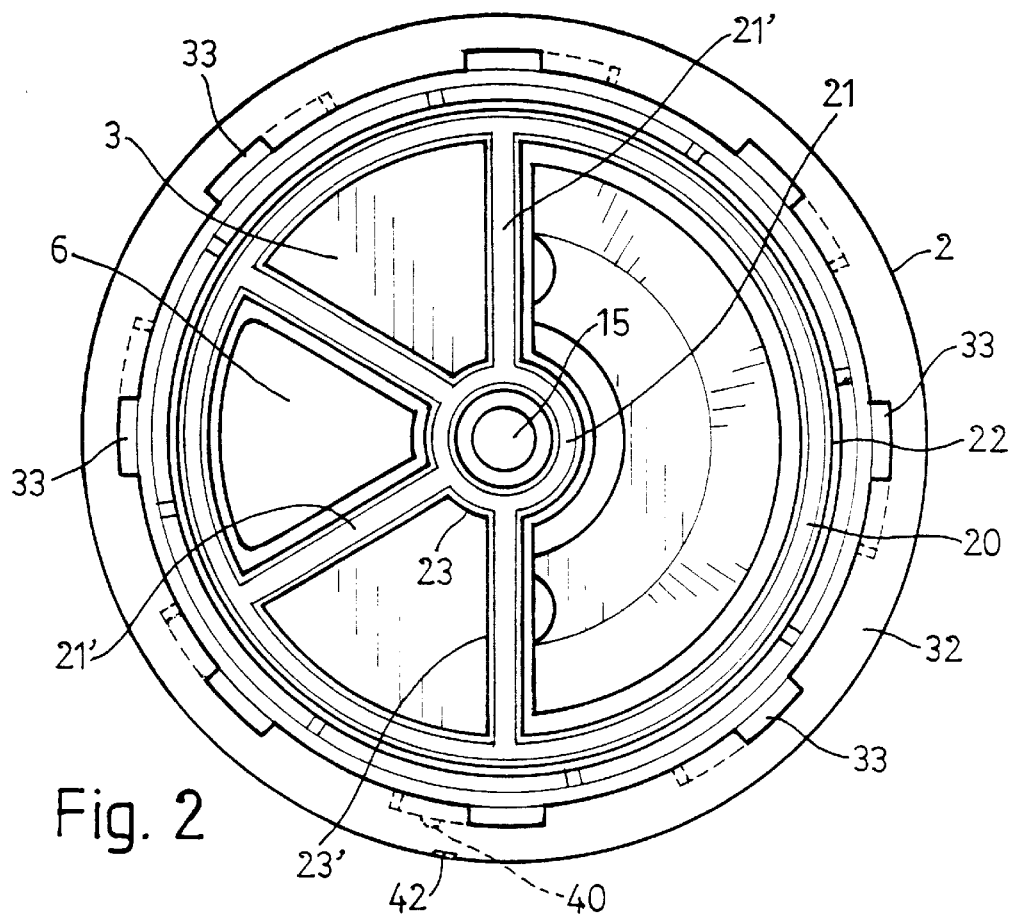
FIG. 2 is a plan-view of the distributor according to the present invention from below of the cover with the obturator bell.
Figure 3:
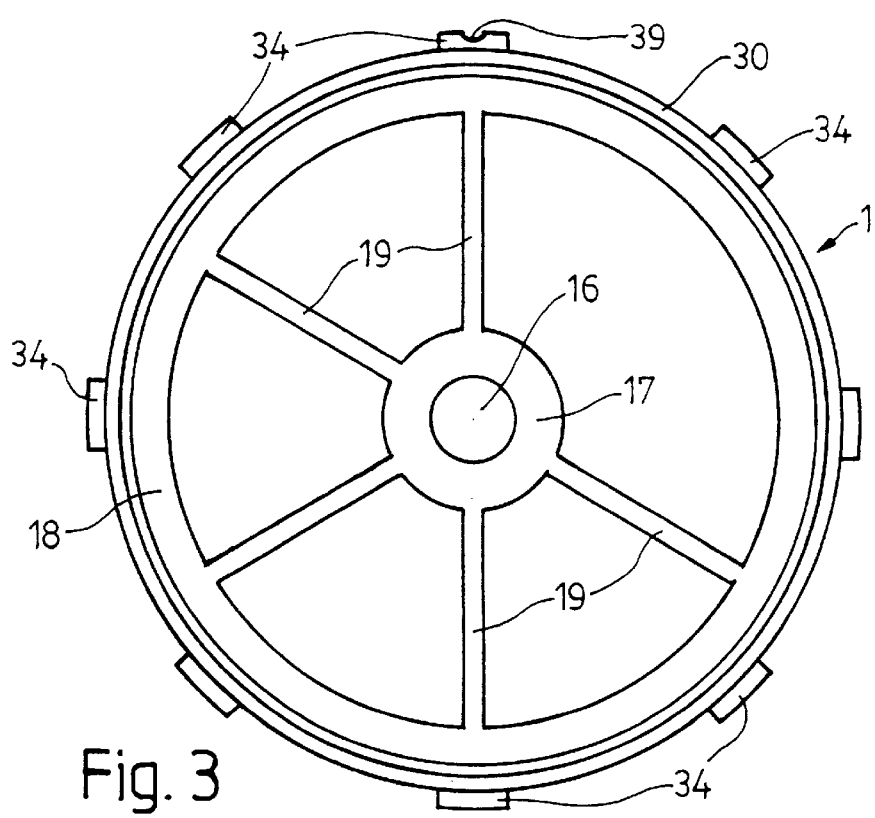
FIG. 3 is a plan-view of the base body without the outlets for the liquid.

According to the figures, the distributor for liquids comprises a base body 1 having a cylindrical configuration and being upperly open, said body having two portions of different diameter, the diameter of the upper portion 1a being bigger than that of the lower portion 1b, this latter being radially compartmented.

Onto the base body 1 is fitted as per a bayonet coupling arrangement a cover 2 after having introduced into said base body an obturator bell 3 resting on the lower portion 1b of said body, the inner space of the upper portion 1a constituting the liquid admission chamber provided to receive the liquid flowing into it through a lateral inlet duct or opening 4.

The compartmented inner space of the lower portion 1b does in its turn constitute the distributing chamber itself provided to distribute the liquid to one or another of respective outlet openings or ducts 5 laterally or inferiorly provided in the compartments of said distributing chamber, said liquid flowing into one or another of said compartments through an opening 6 of the bell 3 which after a previous rotational manipulation of said bell is then arranged on the selected compartment.

The bell 3 for such a purpose does upperly form a centrally located vertical shaft 7 upperly projecting through a central orifice 8 of the cover 2, the end 9' of a handle 9 being eccentrically linked to said shaft so that when actuating said handle the bell 3 is shifted upwards and can thus be rotated to the desired position.

The handle 9 plays through its end 9' on a friction washer 10 housed in a discoidal recess 10' of the cover 2 and upperly flush with the top flat surface of said cover, said end 9' resting on said washer 10 in the passive position of the handle 9 with its also flat lower face.

Around the recess 10' the cover 2 has an annular salient 11 comprising radial slots 11' into one of which a radial appendage 12 will be introduced which is provided on the end 9' of the handle 9 in order to thus stabilize the position chosen for the bell 3, said handle 9 also comprising a lower protrusion 13 coming into abutment with the cover 2 when said handle is actuated in a downward direction.

Said bell 3 is pushed against the lower portion 1b of the base body 1 by a helical spring 14 surrounding the shaft 7, this latter innerly having an axial hollow 15 opening through the bottom of the bell to thus guide it on an upper appendage 16 of the central core 17 from which said lower portion 1b is radially compartmented, said core 17 and appendage 16 also being axially hollowed, the former being inferiorly open whereas the latter is upperly closed.

The bell 3 rests on the inner peripheral step 18 defined by the two portions of the body 1, and also on the edges of the core 17 and of the compartmenting partitions 19, said resting condition being accomplished through a doubly annular seal 20, 21 provided with radial lengths 21' and partially inlaid in circular grooves 22, 23 provided in concentric annular edges of said bell 3, and in radial grooves 23' of this latter.

The central orifice 8 of the cover 2 extends downwards in a centrally located downwardly extending neck 24 against which and through the intermediary of two friction washers 25, 26 the spring 14 is applied which pushes the bell 3 in a downward direction, said neck 24 having in its inner edge a peripheral recess 27 in which an O-ring seal 29 is housed between said washers 25, 26 and a third washer 28 introduced in said recess, said O-ring seal together with another seal 30 also having an O-ring shape and housed in a peripheral recess 31 of the outer edge of the open top of the base body 1 assuring the tight closure of the distributor.

For the attachment as per a bayonet coupling of the cover 2 onto the base body 1 the former comprises a double, peripheral flange 32 extending in an outward and downward direction and innerly having a number of L-shaped recesses 33 into which corresponding protrusions 34 will penetrate and slide, said protrusions being externally provided below the peripheral recess 31 on the open top of said base body 1.

The closure of the distributor is assured with a piece 35 provided to be removably fitted into a recess 36 externally provided in the flange 32 of the cover 2 above one of the inner recesses 33 (see FIGS. 4 and 5) after having previously introduced a vertically downcoming shank 37 provided on said piece 35 into an orifice 38 of said recess 36, said shank having thus been fitted by way of a cotter between respective grooves 39, 40 of one of the outer protrusions 34 of the open top of the base body 1 and of the inner face of the flange 32 of the cover 2, said shank being thus placed within the corresponding recess 33.

The piece 35 has a lip 41 that is parallel to the shank 37 and has an inner end catch 41' provided to prevent an accidental detachment of said piece 35, said catch 41' engaging the small step formed by a vertically provided cul-de-sac slot 42 of the flange 32 of the cover 2.

The base body 1 does also have in the upper portion 1a an outlet opening 43 closed with a plug 44 and provided for receiving the installation of a manometer and/or a purger, whereas the lower portion 1b is provided with a lateral, cylindrical sight 43 in one of the outlet ducts 5.

The distributor can be used, among other applications, in the swimming pool facilities, being in this case fitted to the associated filter body in a lateral arrangement or also on top of this latter, in which case the lower portion 1b of the distributor's base body 1 will inferiorly end in a stepped flange 45 (as illustrated with dash lines in FIG. 1 and as shown by the alternative arrangement of FIG. 7) and a diffuser 46 (FIG. 7).

The invention as described herein may be put into practice in other embodiments differing only in detail from the one described above only by way of example, said other embodiments also falling within the scope of the protection claimed. This distributor for liquids can hence be manufactured in any shape and size with the best suited means and materials and with the most convenient accessories, and its integrating elements can be replaced with others being technically equivalent, all this falling within the spirit of the appended claims.

What is claimed is:

1. A distributor for liquids comprising:
   a base body being laterally provided with the liquid inlet in its upper portion and with several outlets in its lower portion, this latter being compartmented as from a central core;
   an inner, rotatable obturator bell resting through a doubly annular seal provided with radial lengths and partially inlaid in respective grooves provided in the lower resting edges of said bell on the peripheral step determined by the two portions of different diameter forming the base body, said bell also resting on the edges of the central core and of the radial compartmenting partitions of the lower portion of said base body;

a cover provided to be fitted as per a bayonet coupling arrangement onto the base body and having a central orifice and around this latter an upper annular salient comprising radial slots, and a handle to govern the bell from the outside, said handle resting through an end on the area of the cover delimited by the salient, said end being eccentrically linked to a centrally located vertical shaft upperly formed by the bell, said shaft projecting through the orifice of the cover after having received a helical spring surrounding it and pushing the bell in a downward direction, said handle comprising a lower stop delimiting its downward shift and a radial appendage provided on said end to be introduced in one or another of the slots of the salient of the cover in order to positionally stabilize the bell.

2. A distributor for liquids according to claim 1 wherein the closure of the base body by means of the cover fitted onto it as per a bayonet coupling arrangement is assured by means of a cotter formed by the downcoming shank of a piece provided to be removably fitted into a recess upperly provided in an outer, peripheral flange of the cover after having previously introduced said shank into an orifice provided in said recess, said shank having thus been fitted between respective grooves of the inner face of the flange of the cover and of the outer face of the open top of the base body.

3. A distributor for liquids according to claim 1 wherein the shaft of the obturator bell has an axial hollow opening through the bottom of said bell to allow to guide this latter on an upper appendage of the central core of the lower portion of the base body, said core and appendage being also axially hollowed, the core being inferiorly open whereas the appendage is upperly closed.

4. A distributor for liquids according to claim 1 wherein the cover comprises a centrally located downcoming neck against which and through the intermediary of two friction washers the spring is applied which pushes the bell in a downward direction, said neck having in its inner edge a peripheral recess in which an O-ring seal is housed between said two washers and a third washer introduced in said recess.

5. A distributor for liquids according to claim 1 wherein the base body is provided in the outer edge of its open top with a peripheral recess provided to receive an O-ring seal, said base body also having in its upper portion a lateral outlet closed with a plug and provided for receiving the optional installation of a manometer and/or a purger.

6. A distributor for liquids according to claim 1 wherein the cover does upperly comprise around the central orifice a discoidal recess provided to house a friction washer being upperly flush with the top flat surface of the cover and serving as a rest for the end of the handle linked to the upperly extending shaft of the obturator bell.

* * * * *